US008489523B2

(12) United States Patent
Wang et al.

(10) Patent No.: US 8,489,523 B2
(45) Date of Patent: Jul. 16, 2013

(54) CATEGORIZATION AUTOMATION BASED ON CATEGORY ONTOLOGY

(75) Inventors: Wu Wang, Los Altos, CA (US); Wei Wang, Milpitas, CA (US); Mei Marker, Santa Clara, CA (US)

(73) Assignee: Alcatel Lucent, Paris (FR)

( * ) Notice: Subject to any disclaimer, the term of this patent is extended or adjusted under 35 U.S.C. 154(b) by 286 days.

(21) Appl. No.: 13/077,696

(22) Filed: Mar. 31, 2011
(Under 37 CFR 1.47)

(65) Prior Publication Data

US 2011/0258152 A1    Oct. 20, 2011

Related U.S. Application Data

(60) Provisional application No. 61/319,843, filed on Mar. 31, 2010.

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

2011/0258152 A1* 10/2011 Wang et al. ..................... 706/12

OTHER PUBLICATIONS

Carvnar et al. "N-Gram Based Text Categorization", Symposium on Document Analysis and Information Retrieval, 1994, pp. 14.*
Peng et al. "Combining naive Bayes and n-gram language models for text classification", Advances in Information Retrieval, 2003, pp. 15.*

* cited by examiner

*Primary Examiner* — Li-Wu Chang
(74) *Attorney, Agent, or Firm* — Osha Liang, L.L.P.

(57) ABSTRACT

A method for categorization using multiple categories including obtaining multiple uniform resource locators (URLs) associated with the multiple categories, collecting multiple web pages identified by the multiple URLs, generating vocabulary terms based on the multiple web pages, generating an N-gram file including the multiple vocabulary terms, generating multiple classified URLs by labeling the plurality of URLs based on the multiple categories, generating multiple feature vectors by processing the classified URLs and the multiple web pages against the N-gram file, generating a categorization model by applying a machine learning algorithm to the multiple feature vectors, and loading a classifier with the categorization module and the N-gram file.

17 Claims, 6 Drawing Sheets

| Vocabulary Term | Identification Number | IDF | Flag |
|---|---|---|---|
| ⋮ | ⋮ | ⋮ | ⋮ |
| New | 16894 | 1.000 | 12 |
| New York City | 16895 | 1.000 | 0 |
| New car for sale | 16896 | 1.301 | 0 |
| park | 16897 | 0.699 | 1 |
| ⋮ | ⋮ | ⋮ | ⋮ |

N-gram File
300

For the term of interest, $t_i$ = park, the number of web pages in the collection is $|D|$ = 100, the document frequency of the term "park" is $f_D(park)$ = 20, the inverse DF is $\log \dfrac{|D|}{f_D(park)} = \log 5 = 0.699$, the term frequency of the term "park" in Webpage A is $f_T(park)$ = 5, and $$\left( f_T(park) * \log \dfrac{|D|}{f_D(park)} \right)^2 = (5*0.699)^2 = 12.215$$

This calculation is then repeated for every term $t_i$ that appears in Webpage A.

$$\left( f_T(New\ York\ City) * \log \dfrac{|D|}{f_D(New\ York\ City)} \right)^2 = 49.000$$

$$\left( f_T(cars) * \log \dfrac{|D|}{f_D(New\ car\ for\ sale)} \right)^2 = 6.771$$

Finally, the weight of the term of interest, "park" can be calculated:

$$w_i = \dfrac{f_T(park) * \log \dfrac{|D|}{f_D(park)}}{\sqrt{\sum_{j=1}^{n}\left( f_T(t_j) * \log \dfrac{|D|}{f_D(t_j)} \right)^2}}$$

$$= \dfrac{5*0.699}{\sqrt{12.215 + 49.000 + 6.771}} = 0.424$$

FIG. 3B

CATEGORIZATION AUTOMATION BASED ON CATEGORY ONTOLOGY

CROSS-REFERENCE TO RELATED APPLICATION

This application claims priority to U.S. Provisional Patent Application No. 61/319,843, entitled: "Categorization Automation," and filed on Mar. 31, 2010. Accordingly, this application claims priority to U.S. Provisional Patent Application No. 61/319,843 under 35 U.S.C. §119(e). U.S. Provisional Patent Application No. 61/319,843 is incorporated in its entirety by reference.

BACKGROUND

Categorization is the process in which ideas and objects are recognized, differentiated, and understood. Categorization implies that objects are grouped into categories, usually for some specific purpose. Ideally, a category illuminates a relationship between the subjects and objects of knowledge. Categorization is fundamental in language, prediction, inference, decision making and in all kinds of environmental interaction.

SUMMARY

In general, in one aspect, the invention relates to a method for categorization using a plurality of categories. The method comprises obtaining a plurality of uniform resource locators (URLs) associated with a plurality of categories; collecting a plurality of web pages identified by the plurality of URLs; generating a plurality of vocabulary terms based on the plurality of web pages; generating an N-gram file including the plurality of vocabulary terms; generating a plurality of classified URLs by labeling the plurality of URLs based on the plurality of categories; generating a plurality of feature vectors by processing the classified URLs and the plurality of web pages against the N-gram file; generating a categorization model by applying a machine learning algorithm to the plurality of feature vectors; and loading a classifier with the categorization module and the N-gram file.

In general, in one aspect, the invention relates to a computer readable medium storing instructions for categorization using a plurality of categories. The instructions comprise functionality to obtain a plurality of uniform resource locators (URLs) associated with the plurality of categories; collect a plurality of web pages identified by the plurality of URLs; generate a plurality of vocabulary terms based on the plurality of web pages. The instructions further comprise functionality to generate an N-gram file including the plurality of vocabulary terms. The instructions further comprise functionality to generate a plurality of classified URLs by labeling the plurality of URLs based on the plurality of categories; generate a plurality of feature vectors by processing the classified URLs and the plurality of web pages against the N-gram file; generate a categorization model by applying a machine learning algorithm to the plurality of feature vectors; and load a classifier with the categorization module and the N-gram file.

In general, in one aspect, the invention relates to a system for categorization using a plurality of categories. The system comprises a data generation module configured to obtain a plurality of URLs associated with the plurality of categories and collect a plurality of web pages identified by the plurality of uniform resource locators; a vocabulary generator operatively connected to the data collector and configured to generate a plurality of vocabulary terms based on the plurality of web pages; an N-gram generator operatively connected to the vocabulary generator, and configured to generate an N-gram file including the plurality of vocabulary terms; a feature vector generator executing on the hardware processor, operatively connected to the N-gram generator, and configured to generate a plurality of feature vectors by processing the plurality of web pages and classified versions of the plurality of URLs against the N-gram file; a categorization model generator configured to generate a categorization model by applying a machine learning algorithm to the plurality of feature vectors; and a classifier loaded with the categorization model and the N-gram file and configured to predict a category of the plurality of categories based on an input associated with a user.

Other aspects of the invention will be apparent from the following description and the appended claims.

BRIEF DESCRIPTION OF DRAWINGS

FIGS. 3A, 3B, 3C, and 3D show examples in accordance with one or more embodiments of the invention.

DETAILED DESCRIPTION

Figure 1:
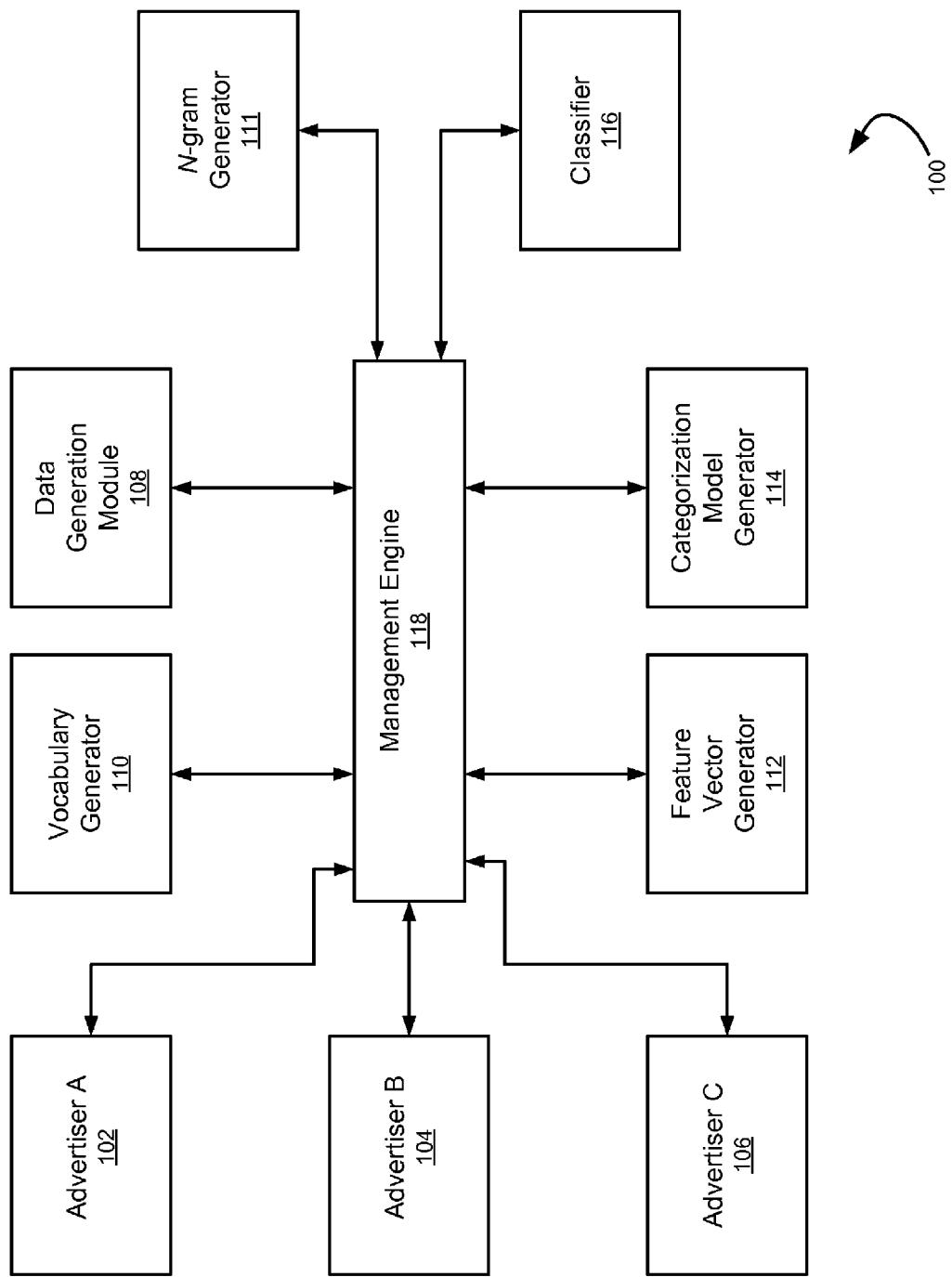
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention include a system and method for categorization automation. After multiple uniform resource locators (URLs) are obtained for the categories in a category ontology, one or more feature vectors are generated from vocabulary terms within the web pages identified by the URLs. The feature vectors serve as training examples for generating categorization models using a variety of machine learning algorithms. The newly generated categorization models and vocabulary terms may be loaded into a classifier and the loaded classifier may be used to predict categories associated with an input (e.g., input associated with a user).

FIG. 1 shows a system (100) in accordance with one or more embodiments of the invention. As shown in FIG. 1, the system (100) has multiple components including one or more advertisers (e.g., Advertiser A (102), Advertiser B (104), Advertiser C (106)), a data generation module (108), a vocabulary generator (110), a N-gram generator (111), a feature vector generator (112), a categorization model generator (114), and a classifier (116). Each of these components are described below and may be located on the same device (e.g., a server, mainframe, desktop PC, laptop, PDA, television, cable box, satellite box, kiosk, telephone, mobile phone, smart phone, etc.) or may be located on separate devices connected by a network (e.g., the Internet), with wired and/or wireless segments.

In one or more embodiments of the invention, the data generation module (108) generates data for categories in a category ontology. Further, categories in the category ontology may include a plurality of subcategories. The category ontology may be stored within the data generation module (108) and/or may be stored in an external repository (not shown). The generated data may correspond to both web pages associated with a category and the URLs of the web pages. Once the URLs are identified, the data generation module collects the corresponding web pages. Accordingly, the data generation module (108) may include a crawler to fetch the contents of the web pages.

In the case of categories tightly linked with keywords, the URLs may be obtained by performing keyword searches using a search engine. In other words, the URLs are the search results of the search engine. Alternatively, the URLs may be obtained from an open directory service. However, as the open directory service may have its own category ontology, it may be necessary to first map the category ontology of the system (100) to the category ontology of the open directory service before the appropriate URLs can be identified and retrieved.

In one or more embodiments of the invention, the data generation module (108) generates classified URLs by labeling the URLs. Specifically, each of the URLs may be labeled with a category from the category ontology. If the URL is the result of a keyword search, the URL is labeled with the category corresponding to the keyword search. In the case of an open directory service, the URL may be labeled with the category in the open service directory (or its mapping in the category ontology) identifying the URL.

In one or more embodiments of the invention, the vocabulary generator (110) generates vocabulary terms based on the web pages (i.e., the web pages collected by the data generation module (108)). In order to generate the vocabulary terms, the vocabulary generator (110) may apply a variety of information theory techniques (e.g., mutual information gain, odd ratio measure, etc.) to the contents (e.g., text) of the web pages. Moreover, one or more vocabulary terms may include multiple words. A vocabulary term including multiple words may be referred to as an n-gram vocabulary term.

In one or more embodiments of the invention, the N-gram generator (111) calculates a document frequency (DF) for each of the n-gram vocabulary terms. The DF is the number of web pages (i.e., the cardinality of web pages) having the n-gram vocabulary term. Once the DF is calculated, the inverse DF (IDF) is also calculated.

In one or more embodiments of the invention, the N-gram generator (111) generates a flag for the first word of an n-gram term. The flag may be a byte in size and record the number of words (i.e., cardinality) in the n-gram term. Specifically, if the n-gram term has 2 words, the second lowest bit of the flag is set (i.e., 00000010). If the n-gram term has 3 words, the third lowest bit of the flag is set (i.e., 00000100), etc. If there exists multiple n-gram terms of different lengths but with the same first word, the flag records the cardinality of each of the multiple n-gram terms. The flag, or its decimal equivalent, may be included in the N-gram file.

For example, consider the 2-gram term "New Mexico," the 3-gram vocabulary term "New York City," and the 4-gram term "New car for sale." In this example, the second lowest bit, the third lowest bit, and the fourth lowest bit of the flag corresponding to "New" would be set (i.e., 00001110). The N-gram file would include 00001110 or 14 as the flag for the first word "New." In one or more embodiments of the invention, the flag is used to speed up the identification of n-gram terms in the text for classification. Further, in one or more embodiments of the invention, each vocabulary term is assigned an identification number. The vocabulary terms, the identification numbers, the IDFs, and the flags may all be stored/recorded in an N-gram file.

In one or more embodiments of the invention, the feature vector generator (112) generates one or more feature vectors by processing the classified URLs and corresponding web pages against the N-gram file. Specifically, each feature vector corresponds to a web page, and each vector element of the feature vector is a weight corresponding to a vocabulary term.

In one or more embodiments of the invention, the weight is calculated by the following:

$$w_i = \frac{f_T(t_i) * \log\frac{|D|}{f_D(t_i)}}{\sqrt{\sum_{j=1}^{n}\left(f_T(t_j) * \log\frac{|D|}{f_D(t_j)}\right)^2}} \quad (1)$$

where $w_i$ is the weight of the $i^{th}$ vocabulary term; $f_T(t_i)$ is the term-frequency of the $i^{th}$ vocabulary term in the web page (i.e., the number of times the $i^{th}$ vocabulary term appears in the web page); $|D|$ is the number of web pages in the collection; n is the number of vocabulary terms (i.e., the cardinality of the vocabulary terms); and $f_D(t_i)$ is the document frequency (discussed above) of the $i^{th}$ vocabulary term; and log $$\frac{|D|}{f_D(t_i)}$$

is the inverse DF (discussed above). In one or more embodiments, the denominator of equation is referred to as the distance of the plurality of vocabulary terms. Those skilled in the art, having the benefit of this detailed description, will appreciate there are alternative equations for calculating the weight of each vocabulary term.

In one or more embodiments of the invention, the categorization model generator (114) builds categorization models based on the feature vectors. Specifically, the categorization model generator (114) applies one or more machine learning algorithms to the feature vectors to learn and build categorization models. The machine learning algorithms may include, for example, Support Vector Machines (SVM), Naïve Bayes, Logistic Regression, Decision Trees, Neural Networks, etc. The categorization model generator (114) may output one or more files corresponding to the one or more generated categorization models. For example, the categorization model generator (114) may output one file per category. The file has multiple entries corresponding to the multiple vocabulary terms, and each entry may record a numerical value representing the significance of a vocabulary term with respect to the category.

In one or more embodiments of the invention, the classifier (116) predicts one or more categories associated with an input. The input may correspond to a news article or academic article, a webpage being accessed by a user, etc. The classifier (116) tests the input against the categorization models and the N-gram file, and selects/outputs the top predicted categories using thresholds. In other words, the classifier (116) outputs one or more categories that have a high probability of being relevant to the input. Accordingly, the classifier (116) may be loaded with the generated categorization model(s) and the N-gram file before the input is tested.

In one or more embodiments of the invention, the advertisers (e.g., Advertiser A (102), Advertiser B (104), Advertiser C (106)) provide advertisements for products and/or services in one or more categories. When at least one relevant category is predicted (e.g., using the classifier (116)) for an input, one or more advertisements provided by the advertisers and relevant to the at least one category may be displayed to the user (e.g., on the web page being accessed by the user, within an email sent to the user, etc.). In one or more embodiments of the invention, the advertisers (e.g., Advertiser A (102), Advertiser B (104), Advertiser C (106)) need to be subscribers in order to view the predicted categories and/or provide advertisements to users. Further, the advertisements may be of any form, including ads on web pages, emails, direct mailings, text messages, telephone calls, etc.

In one or more embodiments of the invention, the management engine (118) provides a link between the advertisers (e.g., Advertiser A (102), Advertiser B (104), Advertiser C (106)), the data generation module (108), the vocabulary generator (110), the N-gram generator (111), the feature vector generator (112), the categorization model generator (114), and the classifier (116). The management engine (118) may be configured to convert data or commands/messages from one format to another format in order to render the components (102, 104, 106, 108, 110, 111, 112, 114, 116) compatible with each other. In one or more embodiments of the invention, the management engine (118) includes a GUI (not shown) for viewing one or more of the inputs and outputs of the components (102, 104, 106, 108, 110, 111, 112, 114, 116).

Figure 2:
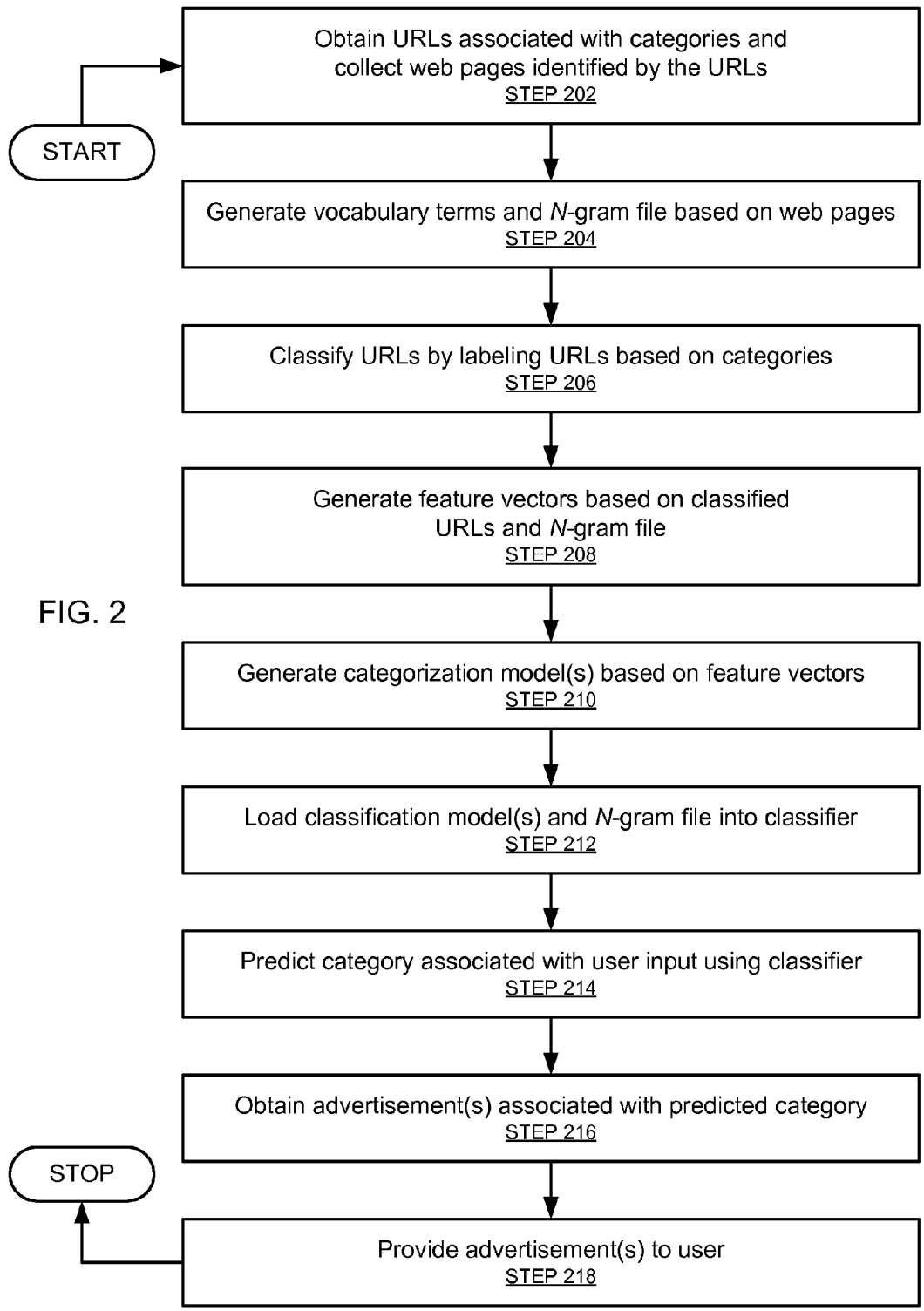
FIG. 2 shows a flowchart in accordance with one or more embodiments of the invention.

FIG. 2 shows a flowchart in accordance with one or more embodiments of the invention. The process depicted in FIG. 2 may be implemented using the system (100), described above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, URLs associated with one or more categories in a category ontology are identified/obtained (STEP 202). Further, the category ontology may include one or more subcategories for each category. In the case of categories tightly linked with keywords, the URLs may be obtained by performing keyword searches using a search engine. In other words, the URLs are the search results of the search engine. For example, the category "auto/luxury" is tightly linked with the keywords "auto" and "luxury." Moreover, the URL "www.veryexpensivecars.com" may be obtained by using the keywords "auto" and "luxury" as search criteria in a search engine. Alternatively, the URLs may be obtained from an open directory service. However, as the open directory service may have its own custom category ontology, it may be necessary to first map the existing category ontology to the custom category ontology of the open directory service before the appropriate URLs can be identified and retrieved. For example, an online directory may list the URL "www.veryexpensivecars.com" under the category "cars/expensive," which is similar to the "auto/luxury" category in the category ontology. Thus, the online directory's "cars/expensive" category must be mapped to the "auto/luxury" category before the URL can be used. Once the URLs associated with the categories are identified, the corresponding web pages (i.e., contents of the web pages) may be collected (e.g., by inputting the URLs into a crawler).

In STEP 204, multiple vocabulary terms are generated based on the collected web pages. The vocabulary terms may be generated by applying a variety of information theory techniques (e.g., mutual information gain, odd ratio measure) to the contents of the web pages. Moreover, one or more vocabulary terms may include multiple words. A vocabulary term including multiple words may be referred to as an n-gram vocabulary term.

Still referring to STEP 204, in one or more embodiments of the invention, a document frequency (DF) is calculated for each of the n-gram vocabulary terms. The DF represents the number of web pages (i.e., the cardinality of web pages) having the n-gram vocabulary term. Once the DF is calculated, an inverse DF (IDF) is also calculated.

In one or more embodiments of the invention, a flag for the first word of an n-gram term is also generated in STEP 204. The flag may be a byte in size and record the number of words (i.e., cardinality) in the n-gram term. Specifically, if the n-gram term has 2 words, the second lowest bit of the flag is set (i.e., 00000010). If the n-gram term has 3 words, the third lowest bit of the flag is set (i.e., 00000100), etc. If there exists multiple n-gram terms of different lengths but with the same first word, the flag records the cardinality of each of the multiple n-gram terms. The flag, or its decimal equivalent, may be included in the N-gram file.

For example, consider the 2-gram term "New Mexico," the 3-gram vocabulary term "New York City," and the 4-gram term "New car for sale." In this example, the second lowest bit, the third lowest bit, and the fourth lowest bit of the flag corresponding to "New" would be set (i.e., 00001110). The N-gram file would include 00001110 or 14 as the flag for the first word "New." In one or more embodiments of the invention, the flag is used to speed up the identification of n-gram terms in the text for classification. Further, in one or more embodiments of the invention, each vocabulary term is assigned an identification number. The vocabulary terms, the identification numbers, the IDFs, and the flags may all be stored/recorded in an N-gram file.

In STEP 206, classified URLs are generated by labeling the obtained URLs (i.e., STEP 202) based on the categories in the category ontology. In other words, each of the URLs may be labeled with a category from the category ontology. If the URL is the result of a keyword search, the URL is labeled with the category corresponding to the keyword search. In the case of an open directory service, the URL may be labeled with the category in the open service directory (or its mapping in the category ontology) identifying the URL.

In the case of keyword searches, the category assigned, as a label, to a given URL may be the category with search results that included the URL. In the case of an open directory service, the category assigned, as a label, to a given URL may be the category in the open service directory identifying the URL. For example, the URL "www.veryexpensivecars.com" may be labeled with "auto/luxury" and/or "cars/expensive."

In STEP 208, feature vectors are generated by processing the classified URLs and corresponding web pages against the N-gram file. Specifically, each feature vector corresponds to a web page, and each vector element of the feature vector is a weight corresponding to a vocabulary term. In one or more embodiments of the invention, the weight is calculated by the following:

$$w_i = \frac{f_T(t_i) * \log \frac{|D|}{f_D(t_i)}}{\sqrt{\sum_{j=1}^{n} \left( f_T(t_j) * \log \frac{|D|}{f_D(t_j)} \right)^2}} \quad (1)$$

where $w_i$ is the weight of the $i^{th}$ vocabulary term; $f_T(t_i)$ is the term-frequency of the $i^{th}$ vocabulary term in the web page (i.e., the number of times the $i^{th}$ vocabulary term appears in the web page); |D| is the number of web pages in the collection; n is the number of vocabulary terms (i.e., the cardinality of the vocabulary terms); and $f_D(t_i)$ is the document frequency (discussed above) of the $i^{th}$ vocabulary term. In one or more embodiments, the denominator of equation is referred to as the distance of the plurality of vocabulary terms. Those skilled in the art, having the benefit of this detailed description, will appreciate there are alternative equations for calculating the weight of each vocabulary term.

In STEP 210, categorization models are generated based on the feature vectors. Specifically, one or more machine learning algorithms are applied to the feature vectors to learn and build categorization models. The machine learning algorithms may include, for example, Support Vector Machines (SVM), Naïve Bayes, Logistic Regression, Decision Trees, Neural Networks, etc. The output of STEP 210 is one or more files corresponding to the one or more generated categorization models. For example, there may be one file per category. The file has multiple entries corresponding to the multiple vocabulary terms, and each entry may record a numerical value representing the significance of a vocabulary term with respect to the category.

In STEP 212, the categorization models (e.g., files corresponding to the one or more categories) and the N-gram file are loaded into the classifier. In STEP 214, the newly loaded classifier is used to predict one or more categories associated with an input. The input may correspond to a news article or academic article accessed by a user, a webpage being accessed by the user, etc. The loaded classifier outputs/selects one or more categories that have a high probability of being relevant to the input. The classifier tests the input against the categorization models and the N-gram file, and selects/outputs the top predicted categories using thresholds.

In STEP 216, one or more advertisements associated with the predicted categories are obtained. The advertisements for one or more products and/or services may be obtained from one or more advertisers. When at least one relevant category is predicted for an input, one or more advertisements provided by the advertisers and relevant to the at least one category may be displayed to the user (e.g., on the web page being accessed by the user, within an email sent to the user, etc.) (STEP 218).

Those skilled in the art, having the benefit of this detailed description, will appreciate that each time new categories are introduced to the category ontology, one or more of the steps in FIG. 2 may be executed to generate new categorization models. Once the new categorization models are loaded into the classifier, any incoming text will be categorized against all categories including the new categories.

The following is an example in accordance with one or more embodiments of the invention. There exists a collection of 100 web pages. Using one or more information theory techniques, a set of vocabulary terms including "park," "New York City," and "New car for sale" is identified for the collection of 100 web pages. Those skilled in the art, having the benefit of this detailed description, will appreciate that the vocabulary term "New York City" is a 3-gram vocabulary term and the vocabulary term "New car for sale" is a 4-gram vocabulary term.

Within the 100 web pages, there exists 20 web pages each having at least one instance of the vocabulary term "park"; there exists 10 web pages each having at least one instance of the vocabulary term "New York City"; and there exists 5 web pages each having at least one instance of the vocabulary term "New cars for sale." Further, within Web Page A of the 20 web pages, the vocabulary term "park" appears 5 times, the vocabulary "New York City" appears 7 times, and the vocabulary term "New cars for sale" appears twice.

After the vocabulary terms are identified, an identification number is assigned to each vocabulary term and an inverse document frequency (IDF) is calculated for each vocabulary term. Further, flags may be set up for vocabulary terms having multiple words. The vocabulary terms, the identification numbers, the IDFs, and the flags are all stored/recorded in an N-gram file.

Figure 3A:

FIG. 3A shows a portion of an N-gram file (300). As shown in FIG. 3A, the N-gram file (300) has multiple entries corresponding to the multiple vocabulary terms (i.e., New, New York City, New cars for sale, park). Further, the N-gram file (300) with its flag corresponding to the first word of an n-gram vocabulary term. For example, the N-gram file (300) includes an entry for "New," which is the first word of the n-gram vocabulary terms "New York City" and "New cars for sale." This entry for "New" also includes a flag of 12. The binary equivalent of 12 is 00001100. Both the third and fourth lowest bits are set, representing the 3-gram vocabulary term "New York City" and the 4-gram vocabulary term "New car for sale," respectively. As also shown in FIG. 3A, the N-gram file (300) includes the identification numbers assigned to each of the vocabulary terms.

Following generation of the N-gram file, a feature vector for each web page in the collection is generated. As discussed above, each element of the feature vector corresponds to a vocabulary term. Specifically, an element includes the weight of the vocabulary term with respect to the web page. FIG. 3B steps through calculation of the weight of "park" with respect to Web Page A according to equation (1).

Figure 3C:
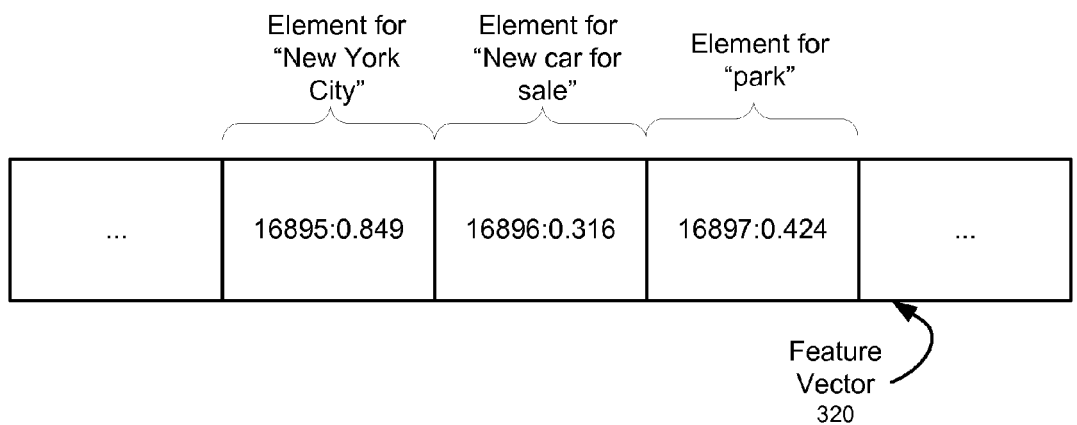

FIG. 3C shows a portion of a feature vector (320) for Web Page A. As shown in FIG. 3C, the feature vector (320) includes an element corresponding to the vocabulary term "park," an element corresponding to the vocabulary term "New York City," and an element corresponding to the vocabulary term "New cars for sale." Each element also includes the identification number of the corresponding vocabulary term. Specifically, the value to the left of the colon is the identification number, while the value to the right of the colon is the calculated weight.

Figure 3D:
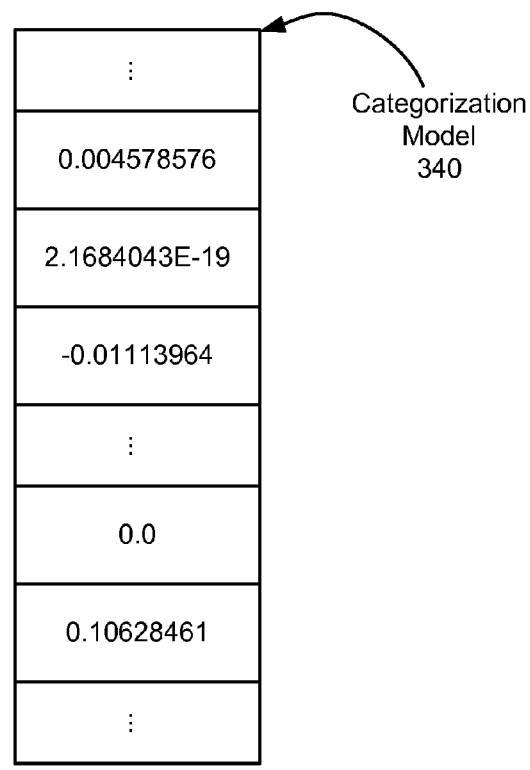

After the feature vectors are generated, including the feature vector (320) for Web Page, one or more machine learning algorithms are applied to the feature vectors to build categorization models. FIG. 3D shows a categorization model (340) generated from the feature vector (320) for Web Page A. As shown in FIG. 3D, each entry of the categorization model (340) records a numerical value representing the significance of a vocabulary term to the category.

Figure 4:
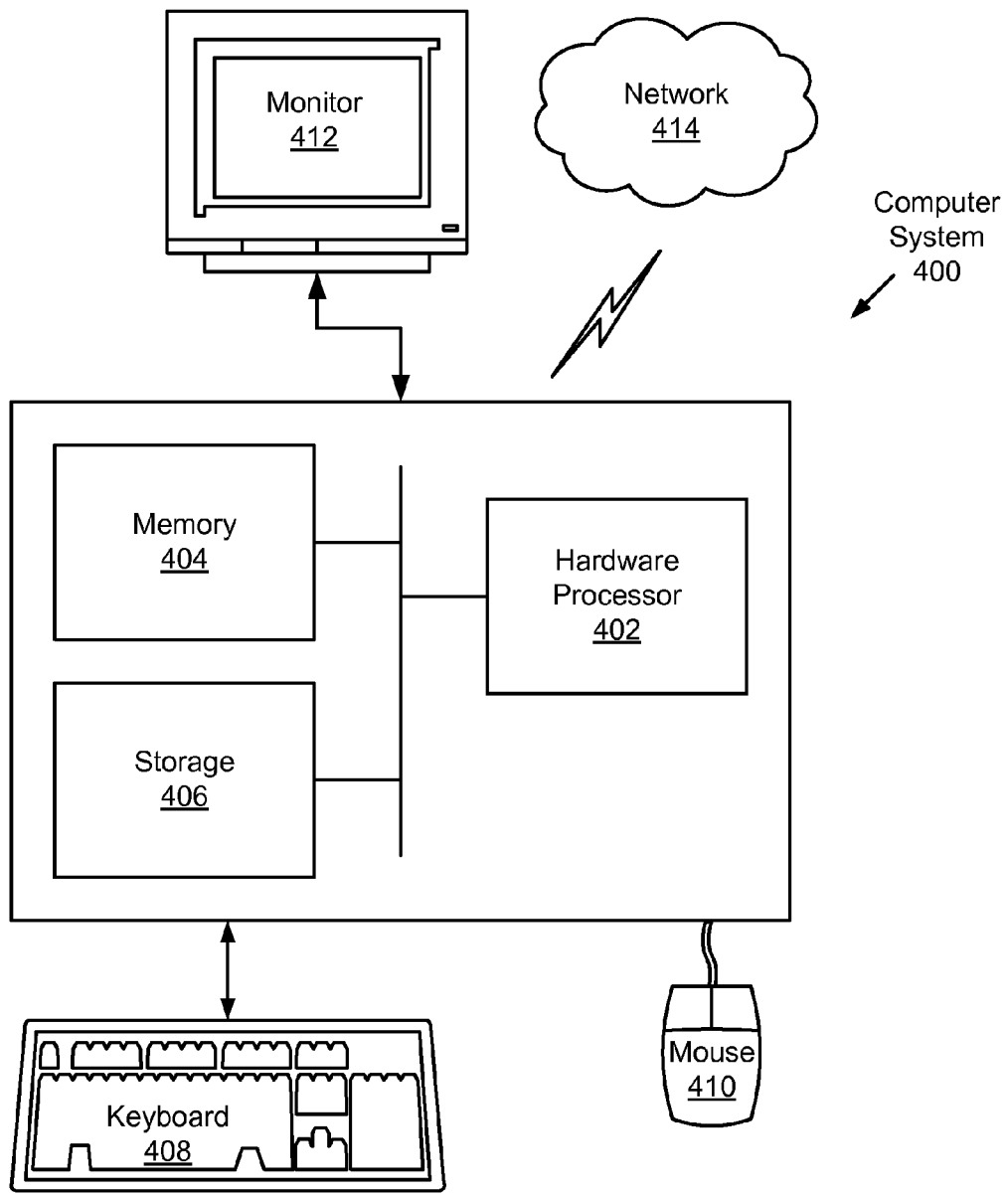
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402) (such as a central processing unit (CPU), integrated circuit, etc.), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g., data generation module (108), vocabulary generator (110), feature vector generator (112), categorization model generator (114), etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for categorization using a plurality of categories, comprising:
    obtaining, by a hardware processor, a plurality of uniform resource locators (URLs) associated with the plurality of categories;
    generating, by the hardware processor, a plurality of classified URLs by labeling the plurality of URLs based on the plurality of categories;
    collecting, by the hardware processor, a plurality of web pages identified by the plurality of classified URLs;
    generating, by the hardware processor, a plurality of vocabulary terms, each comprising a plurality of words, based on the plurality of web pages;
    generating, by the hardware processor, an N-gram file including the plurality of vocabulary terms and comprising a starting word of the plurality of words and a flag corresponding to a cardinality of the plurality of words;
    generating, by the hardware processor, a plurality of feature vectors by processing the classified URLs and the plurality of web pages against the N-gram file;
    generating, by the hardware processor, a categorization model by applying a machine learning algorithm to the plurality of feature vectors; and
    loading a classifier with the categorization module and the N-gram file,
    wherein the classifier is configured to select a category of the plurality of categories for an input associated with a user.

2. The method of claim 1, further comprising:
    selecting a vocabulary term of the plurality of vocabulary terms;
    identifying a document frequency of the vocabulary term within the plurality of web pages; and
    calculating an inverse document frequency (IDF) for the vocabulary term by applying a logarithm function to a ratio based on the plurality of web pages and the document frequency of the vocabulary term,
    wherein the N-gram file includes the IDF of the vocabulary term.

3. The method of claim 1, wherein generating the plurality of feature vectors comprises:
    selecting a first vocabulary term and a second vocabulary term of the plurality of vocabulary terms;
    identifying a term frequency of the first vocabulary term within a web page of the plurality of web pages;
    identifying a term frequency of the second vocabulary term within the web page of the plurality of web pages;
    identifying an inverse document frequency (IDF) of the first vocabulary term and an IDF of the second vocabulary term from the N-gram file;
    calculating a weight for the first vocabulary term based on the IDF of the first and second vocabulary term and the term frequency of the first and second vocabulary term; and
    calculating a weight for the second vocabulary term based on the IDF of the first and second vocabulary term and the term frequency of the first and second vocabulary term.

4. The method of claim 3, wherein calculating the weight for the first vocabulary term comprises:
    calculating a product of the term frequency of the first vocabulary term by the IDF of the first vocabulary term;
    calculating a distance of the plurality of vocabulary terms; and
    dividing the product by the distance.

5. The method of claim 3, further comprising:
    assigning identification numbers to the first vocabulary term and second vocabulary term.

6. The method of claim 1, wherein the input is text within a web page accessed by the user, and wherein the advertisement is displayed on the web page.

7. The method of claim 1, further comprising:
    selecting an advertisement corresponding to the category; and
    presenting the advertisement to the user.

8. A non-transitory computer readable storage medium storing instructions for categorization using a plurality of categories, the instructions comprising functionality to:
    obtain a plurality of uniform resource locators (URLs) associated with the plurality of categories;
    generate a plurality of classified URLs by labeling the plurality of URLs based on the plurality of categories;
    collect a plurality of web pages identified by the plurality of classified URLs;
    generate a plurality of vocabulary terms, each comprising a plurality of words, based on the plurality of web pages;
    generate an N-gram file including the plurality of vocabulary terms and comprising a starting word of the plurality of words and a flag corresponding to a cardinality of the plurality of words;
    generate a plurality of feature vectors by processing the classified URLs and the plurality of web pages against the N-gram file;
    generate a categorization model by applying a machine learning algorithm to the plurality of feature vectors; and load a classifier with the categorization module and the N-gram file,
wherein the classifier is configured to select a category of the plurality of categories for an input associated with a user.

9. The non-transitory computer readable storage medium of claim 8, the instructions further comprising functionality to:
select a vocabulary term of the plurality of vocabulary terms;
identify a document frequency of the vocabulary term within the plurality of web pages; and
calculate an inverse document frequency (IDF) for the vocabulary term by applying a logarithm function to a ratio based on the plurality of web pages and the document frequency of the vocabulary term,
wherein the N-gram file includes the IDF of the vocabulary term.

10. The non-transitory computer readable medium of claim 8, the instructions to generate the plurality of feature vectors comprising functionality to:
select a first vocabulary term and a second vocabulary term of the plurality of vocabulary terms;
identify a term frequency of the first vocabulary term within a web page of the plurality of web pages;
identify a term frequency of the second vocabulary term within the web page of the plurality of web pages;
identify an inverse document frequency (IDF) of the first vocabulary term and an IDF of the second vocabulary term from the N-gram file;
calculate a weight for the first vocabulary term based on the IDF of the first and second vocabulary term and the term frequency of the first and second vocabulary term; and
calculate a weight for the second vocabulary term based on the IDF of the first and second vocabulary term and the term frequency of the first and second vocabulary term.

11. The non-transitory computer readable medium of claim 10, the instructions to calculate the weight for the first vocabulary term comprising functionality to:
calculate a product of the term frequency of the first vocabulary term by the IDF of the first vocabulary term;
calculate a distance of the plurality of vocabulary terms; and
divide the product by the distance.

12. The non-transitory computer readable medium of claim 10, the instructions further comprising functionality to:
assign identification numbers to the first vocabulary term and second vocabulary term.

13. The non-transitory computer readable medium of claim 8, the instructions further comprising functionality to:
select an advertisement corresponding to the category; and
present the advertisement to the user.

14. A system for categorization using a plurality of categories, comprising:
a hardware processor;
a data generation module configured to obtain a plurality of URLs associated with the plurality of categories and collect a plurality of web pages identified by the plurality of uniform resource locators, wherein the plurality of URLs are labeled based on the plurality of categories to generate a plurality of classified URLs;
a vocabulary generator operatively connected to the data collector and configured to generate a plurality of vocabulary terms, each comprising a plurality of words, based on the plurality of web pages;
an N-gram generator operatively connected to the vocabulary generator, and configured to generate an N-gram file including the plurality of vocabulary terms and comprising a starting word of the plurality of words and a flag corresponding to a cardinality of the plurality of words;
a feature vector generator executing on the hardware processor, operatively connected to the N-gram generator, and configured to generate a plurality of feature vectors by processing the plurality of web pages and the plurality of classified URLs against the N-gram file;
a categorization model generator configured to generate a categorization model by applying a machine learning algorithm to the plurality of feature vectors; and
a classifier loaded with the categorization model and the N-gram file and configured to predict a category of the plurality of categories based on an input associated with a user.

15. The system of claim 14, wherein the feature vector generator is further configured to:
select a first vocabulary term and a second vocabulary term of the plurality of vocabulary terms;
identify a term frequency of the first vocabulary term within a web page of the plurality of web pages;
identify a term frequency of the second vocabulary term within the web page of the plurality of web pages;
identify an inverse document frequency (IDF) of the first vocabulary term and an IDF of the second vocabulary term from the N-gram file;
calculate a weight for the first vocabulary term based on the IDF of the first and second vocabulary term and the term frequency of the first vocabulary term and the second vocabulary term; and
calculate a weight for the second vocabulary term based on the IDF of the first and second vocabulary term and the term frequency of the first and second vocabulary term.

16. The system of claim 15, wherein the N-gram generator is further configured to:
assign identification numbers to the first vocabulary term and the second vocabulary term.

17. The system of claim 14, wherein the text is input within a web page accessed by the user.

* * * * *